Nov. 3, 1959 D. D. McRAE 2,911,528
TELEMETRY DEMODULATOR
Filed Nov. 6, 1957
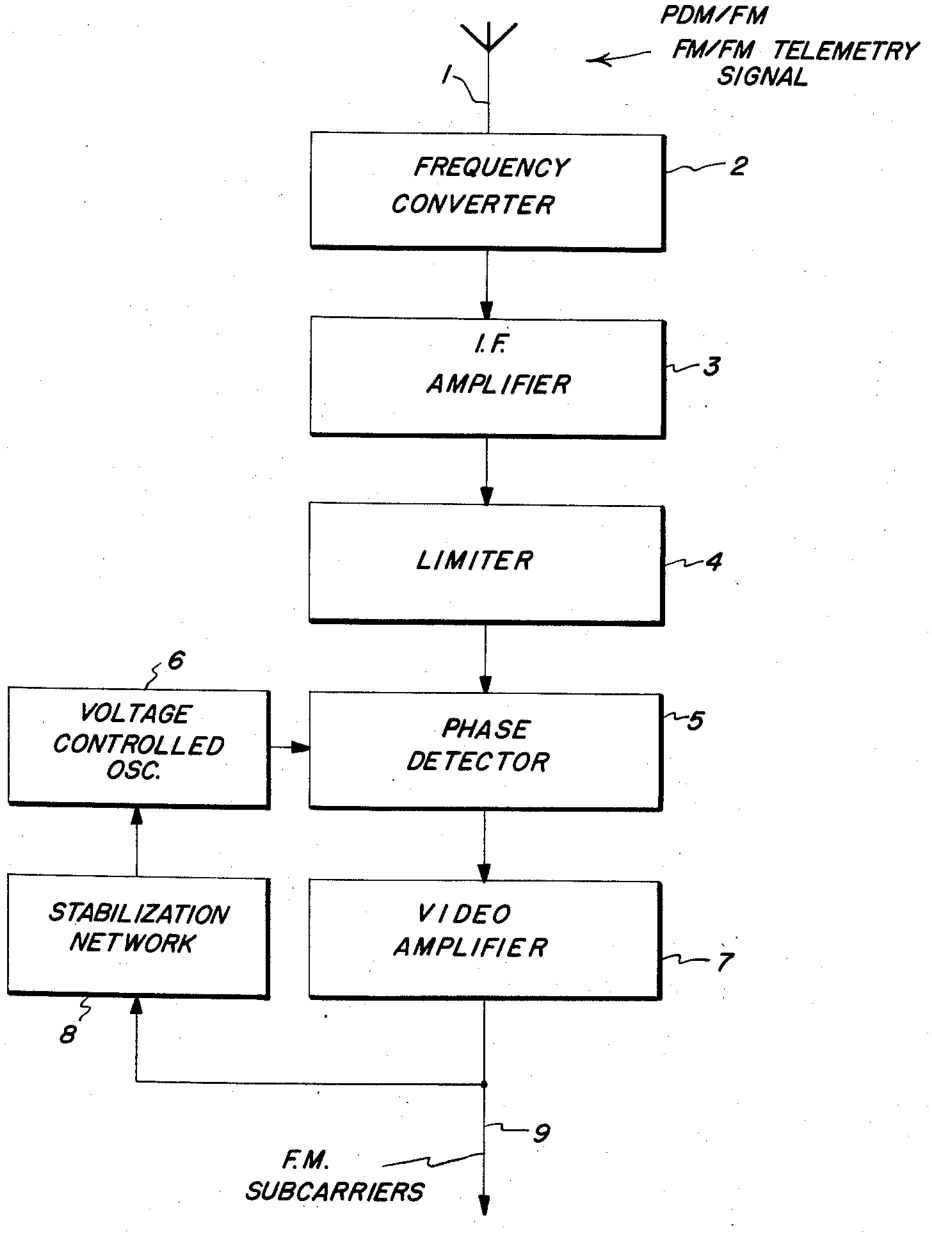
INVENTOR.
DANIEL D. McRAE
BY Hurvitz & Rose
ATTORNEYS United States Patent Office 2,911,528

Patented Nov. 3, 1959

2,911,528

TELEMETRY DEMODULATOR

Daniel D. McRae, Melbourne, Fla.

Application November 6, 1957, Serial No. 694,834

4 Claims. (Cl. 250—27)

The present invention relates generally to a system for demodulating frequency modulated sub-carrier modulated carriers, and more particularly to a frequency modulated signal demodulator for sub-carrier modulated carriers having provision for lowering the improvement threshold of the system.

It is known that multiplex frequency modulation systems such as those commonly used in telemetering applications (for example, FM/FM and PDM/FM) encounter high signal to noise ratios for the information being transmitted, when the receiver reaches its improvement threshold. It is, therefore, of considerable importance to provide a system which is capable of reducing or lowering this threshold. In accordance with the present invention, utilization is made of the phase locked type of frequency modulator detector, as a device for reducing the improvement threshold of a FM receiver which is being utilized to detect frequency modulated sub-carriers or pulse duration modulated sub-carriers of a main frequency modulated carrier. It is known in the art to utilize phase locked detecting means for detecting frequency modulated sub-carriers once these have been separated from a main carrier. It is also well known to utilize a phase locked detector for detecting audio signals present as frequency modulation of a main carrier. It has been discovered, however, that a radical and unexpected reduction of improvement threshold occurs in telemetry receivers when a phase locked detector is employed to detect sub-carriers present on the main carriers, these sub-carriers being frequency modulated or pulse duration modulated sub-carriers. No reason can be reliably advanced for this improvement which has been achieved upon an experimental or empirical basis only, and which exceeds by a great factor the improvement which might have been expected on the basis of calculations. The improvement appears to be derived partly from the use of a limiter antecedent to the phase detector of the phase locked demodulator and still further by the character of the stabilization network of the phase locked detector which becomes feasible due to the frequency separations of the signals being treated. However, I do not desire to be restricted to any specific explanation of the theory of my invention.

It has been known for a considerable period that there are two types of phase locked demodulators. In one of these a directly synchronized oscillator functions as a partial limiter, and absorbs real power from the signal source. Detectors of this type have been described in an article by J. R. Woodyard, in Proceedings IRE, pages 612 to 619, vol. 25. A second type of phase locked demodulator utilizes an indirectly synchronized oscillator which is synchronized with a carrier by means of an auxiliary controlled tube, which is supplied with frequency control signal derived from the phase detector of the phase locked demodulator via a stabilization network. In the past it had been considered that phase locked demodulators of the latter type do not require and should not be employed in conjunction with amplitude limiters, although it has been recognized that the first type of phase locked demodulator should be employed in conjunction with amplitude limiters antecedent thereto.

I have discovered that, in the application of phase locked detectors to the demodulation of the main carrier of FM/FM telemetry signals or PDM/FM telemetry signals, utilization of an amplitude limiter contributes greatly to the reduction of improvement threshold of the receiver. It is possible that this is the case because of the character of the modulation which is required to be abstracted from the main character, the modulation consisting of sub-carriers which in themselves are of relatively high frequency, as distinguished from audio information which includes comparatively low frequency components, or in comparison with the demodulated output of FM sub-carrier demodulators or PDM/FM sub-carrier demodulators.

Moreover, systems of the type described include a stabilization network intermediate the output signal of the system and the voltage controlled oscillator which is locked to the incoming signal. In accordance with the present invention, the stabilizing network is designed such that very high loop gains are available for frequencies below the information frequencies and moderately high loop gains are available for all frequencies of information. This permits the loop to follow very closely the D.C. drifts in the input frequency and nevertheless to maintain loop stability.

It is accordingly an object of the present invention to provide a novel system for detecting or demodulating telemetry sub-carriers imposed on the main carrier of FM/FM telemetry signals or on a PDM/FM telemetry signal.

It is still a further object of the invention to provide a novel system for detecting telemetry sub-carriers by means of a receiver which includes an amplitude limiter in cascade with a phase locked sub-carrier demodulator.

It is still another object of the present invention to provide a system for detecting sub-carriers impressed on the main carrier as an FM/FM telemetry signal or a PDM/FM telemetry signal, wherein the stabilization network between the phase detector and the voltage controlled oscillator of a phase locked sub-carrier demodulator employs very high loop gains for frequencies below the information frequency and moderately high loop gains for information frequencies, whereby to allow the loop to follow very closely the D.C. drifts in the carrier frequency and to maintain loop stability, simultaneously.

The above and still further objects, features and advantages of the present invention will become apparent upon consideration of the following detailed description of one specific embodiment thereof, especially when taken in conjunction with the accompanying drawings, wherein:

The single figure of the drawing is a block diagram of a system in accordance with the invention.

Referring now more specifically to the accompanying drawings, the reference numeral 1 denotes an antenna for receiving PDM/FM or FM/FM telemetry signals from a remote source. The signal intercepted by the antenna 1 is applied to a frequency converter 2 which converts the telemetry band to an I.F. frequency band, which is in turn amplified in an I.F. amplifier 3 and applied to a wide band limiter 4. The amplitude limited signal is applied to one input of a phase detector 5, which acts as a multiplier. To a further input terminal of phase detector 5 is applied the output of a voltage controlled oscillator 6. The output of the phase detector 5 is amplified in a video amplifier 7, which also supplies system output signal. The voltage controlled oscillator 6 is controlled in respect to frequency from the output of the video amplifier 7 via a stabilization network 8.

The video amplifier 7 may have a pass band adapted to pass the telemetry sub-carriers which modulate the main carrier being received at the antenna 1. The stabilization network 8 is arranged to provide very high loop gains for frequencies below the information frequencies provided at the output of the video amplifier 7 but only moderately high loop gain for information frequencies.

Since the voltage controlled oscillator 6 may more readily follow relatively low frequencies, and since the loop gain is far higher for the lower frequencies than it is for the information frequencies, the voltage controlled oscillator 6 may be caused to follow with extreme closeness D.C. drifts in the input frequency, and in this respect the video amplifier 7 must be one capable of passing D.C. signal, as must also the stabilization network 8. The voltage controlled oscillator 6 accordingly may be considered to be precisely synchronized with the carrier as delivered to the I.F. amplifier 3 through the phase detector 4 via the limiter 4. Since the stabilization network has only moderately high loop gains for information frequencies, the voltage controlled oscillator 6 does not precisely follow the frequency modulations imposed on the main carrier by the sub-carriers, and this is required so that output signal may be provided at the lead 9.

As is conventional in phase locked demodulator systems, the phase detector 1 provides an output component, the magnitude of which is proportional to the phase difference between the carrier applied thereto from the limiter 4 and the oscillator signal applied thereto from the voltage controlled oscillator 6. The mean phase angle between these two signals is normally arranged to be 90°, that is, these signals are in phase quadrature, and this is the phase relation which exists and is required to exist between the signals when the carrier supplied by the limiter is undeviated, or when it is at its center frequency, for the system to be considered D.C. noise free. However, when the applied carrier is frequency modulated, the phase detector 5 and the signal applied by the voltage controlled oscillator to the phase detector 5 varies about quadrature as a mean value, and the departure from quadrature may be as much as 45°.

As is well known in the pertinent art, the phase detector 5 constitutes effectively a multiplier device, the output of which is proportional to the product of the effective values of the two signals applied thereto. It follows that systems of the type described operate as co-relation detectors.

The D.C. component of output of the video amplifier 7 exists by virtue of the mean difference in phase between the two inputs of the phase detector 5. Since the sub-carriers are widely separated from the D.C. component, in frequency, it is readily possible to design the stabilization network 8 to provide a wide difference in gain for sub-carriers signals and for video signals. It thus becomes readily possible to establish the mean phase of the signals applied to the phase detector with extreme precision. This possibility explains in part the feasibility of obtaining a very low improvement threshold in systems according to the present invention.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A system for detecting telemetry sub-carriers of a frequency modulated carrier, comprising means for receiving a main carrier frequency modulated by at least one telemetry sub-carrier, means for converting said main carrier to an intermediate frequency carrier modulated by said at least one telemetry sub-carrier, means for detecting said at least one telemetry sub-carrier comprising a phase locked demodulator, said phase locked demodulator including a phase detector having two input terminals and an output terminal, means for amplitude limiting said intermediate frequency carrier to derive an amplitude limited signal modulated in frequency by said at least one telemetry sub-carrier, a voltage controllable local oscillator having a mean frequency equal to the carrier frequency of said amplitude limited signal and a phase which is in quadrature with the phase of said carrier of said amplitude limited signal, a video amplifier connected to the output terminal of said phase detector, means for applying said amplitude limited signal to one input terminal of said phase detector, means for coupling said local oscillator to the other input terminal of said phase detector, a voltage control input terminal for said local oscillator, a feed-back stabilization network between the output of said video amplifier and said voltage control input terminal, said feed-back stabilization network having extremely high output for direct current and for frequencies far below the frequencies of said at least one sub-carrier and moderate output for the frequencies of said at least one sub-carrier, said video amplifier and said feed-back and stabilization loop having an effective pass band including direct current.

2. The combination according to claim 1 wherein said telemetry sub-carrier is a frequency modulated sub-carrier.

3. The combination according to claim 1 wherein said telemetry sub-carrier is a pulse duration modulated sub-carrier.

4. The combination according to claim 1 wherein said at least one telemetry sub-carrier is a plurality of telemetry sub-carriers.

References Cited in the file of this patent

UNITED STATES PATENTS

| | | |
|---|---|---|
| 2,332,540 | Travis | Oct. 26, 1943 |
| 2,410,275 | Eilenberger | Oct. 29, 1946 |
| 2,462,759 | McCoy | Feb. 22, 1949 |
| 2,810,782 | Hester | Oct. 22, 1957 |

UNITED STATES PATENT OFFICE

CERTIFICATE OF CORRECTION

Patent No. 2,911,528 November 3, 1959

Daniel D. McRae

It is hereby certified that error appears in the above numbered patent requiring correction and that the said Letters Patent should read as corrected below.

In the grant, lines 1, 2 and 3, for "Daniel D. McRae, of Melbourne, Florida," read -- Daniel D. McRae, of Melbourne, Florida, assignor to Radiation, Inc., of Melbourne, Florida, a corporation of Florida, --; line 12, for "Daniel D. McRae, his heirs" read -- Radiation, Inc., its successors --; in the heading to the printed specification, line 3, for "Daniel D. McRae, Melbourne, Fla." read -- Daniel D. McRae, Melbourne, Fla., assignor to Radiation, Inc., Melbourne, Fla., a corporation of Florida --.

Signed and sealed this 19th day of April 1960.

(SEAL)
Attest:

KARL H. AXLINE

Attesting Officer

ROBERT C. WATSON
Commissioner of Patents